United States Patent [19]

Fromm et al.

[11] 4,339,658

[45] Jul. 13, 1982

[54] METHOD AND A DEVICE FOR MONITORING AND MINIMIZING LIGHT LOSSES AT A SPLICING LOCATION FOR GLASS FIBER CABLES

[75] Inventors: Ingrid Fromm; Hans Unterberger, both of Munich, Fed. Rep. of Germany

[73] Assignee: Siemens Aktiengesellschaft, Berlin and Munich, Fed. Rep. of Germany

[21] Appl. No.: 149,345

[22] Filed: May 13, 1980

[30] Foreign Application Priority Data

Jun. 8, 1979 [DE] Fed. Rep. of Germany ....... 2923363

[51] Int. Cl.³ .............................................. G02B 5/14
[52] U.S. Cl. ................................................. 250/227
[58] Field of Search ........................ 250/227; 350/96.1

[56] References Cited

U.S. PATENT DOCUMENTS 4,103,154 7/1978 d'Auria et al. ....................... 250/227
4,284,449 8/1981 Stone ................................. 250/227 X

*Primary Examiner*—David C. Nelms
*Assistant Examiner*—Darwin R. Hostetter
*Attorney, Agent, or Firm*—Hill, Van Santen, Steadman, Chiara & Simpson

[57] ABSTRACT

A method and device for monitoring and minimizing the splicing losses at a splicing location for glass fiber cables characterized by a measuring cylinder which has a hinge to enable opening the cylinder up to place it around a splicing connection and has a photosensitive layer for converting a light escaping at the splicing location into an electrical signal and a device for evaluating the electrical signal. The photoelectric sensing device can be a continuous layer or a series of photoelectric elements electrically interconnected and the device for evaluating the electrical signal produced by the photoelectric sensing device preferably includes ear phones which converts the electrical signal into an accoustical signal and the light being applied to the cable is applied with a frequency in the audible frequency range of an ear. If a continuous light signal is sent or an extremely high frequency light signal, an electrical current measuring device can be utilized to evaluate the output of the sensing layer or elements.

13 Claims, 3 Drawing Figures

METHOD AND A DEVICE FOR MONITORING AND MINIMIZING LIGHT LOSSES AT A SPLICING LOCATION FOR GLASS FIBER CABLES

BACKGROUND OF THE INVENTION

The present invention is concerned with the method for monitoring and minimizing the loss of light at a splicing location for glass fiber cables and a device for practicing the method.

A problem in the laying of glass fiber cables is the splicing of the fibers of each cable in the field. A splicing location for the fiber cables should have light losses which are as low as possible and an optimum splice of glass fiber cable is extremely difficult when made in the field. This is due to the fact that the laboratory equipment and/or electrical sources are not readily available.

SUMMARY OF THE INVENTION

The present invention is providing a method and a device for performing the method which makes it possible for the erection engineers to perform the monitoring and the minimizing of light losses at a splicing location without requiring a high technical outlay for equipment and without requiring an electrical supply. The invention provides these tasks by means of a method for monitoring and minimizing splicing losses in the splicing of glass fiber cables which method comprises the steps of passing a light through one of the cables to be spliced, sensing the intensity of the light loss at the location of the splice photoelectrically to create a signal, evaluating the created signal and during evaluation of the created signal, adjusting the position of the two cable ends being spliced together relative to each other to obtain a minimum signal produced by a minimum loss of light at the splicing location. Thus, the light power which exits from a splicing location in case of an incomplete, improperly aligned splice is sensed photoelectrically and the signal which is then created from this exiting or loss light power is evaluated. The members being spliced together can then be adjusted until they obtain a minimum amount of light loss at the splicing location and this position is then recognized by the evaluation of the signal produced photoelectrically. The invention offers an advantage that only a low technical outlay is required and a local current supply is not necessary. Besides these advantages, the splicing operation during the adjustment will not be hindered by the evaluation of the derivable signals.

In particular, it is desirable that the light being coupled into the cables is in the form of light pulses so that the signal being created by the photoelectric sensing device creates electrical pulses. It is also desirable that the frequency of the light is in the audio range of the human ear and preferably at the frequency of the maximum sensitivity of the ear which is approximately 1000 Hz so that the electrical pulses formed by the sensed light is at a frequency of 1000 Hz and can be converted by an electrical accoustical converter such as head phones into an audible tone. Thus, the positioning of the ends in the optimum position for the splice will produce a tone in the head phones having a minimum intensity. In order to obtain a minimum intensity of the tone even when the ends of the cables are in the desired position with the lowest light loss, the intensity of the light being coupled into the fiber cables is adjusted to compensate for the cable attenuation due to the length of the cable so that at least a minimum amount of light to create an audible tone in the electrical accoustical converter is always present at the splicing location.

In the event the light pulses are higher than that which is in the audible range for the human ear or the light is a continuous light source, the electrical signal being created can then be evaluated by passing the signal through an electrical current measuring device.

The device for performing the method preferably includes a measuring cylinder having a frame connected by hinge means for enabling opening up of the cylinder, an interior surface of the measuring cylinder being provided with photoelectric sensing means for sensing light and creating an electrical signal, and said photoelectric sensing means having a pair of connections extending to means for evaluating the electrical signal created by the photoelectric sensing means. The photoelectric sensing means can be either a continuous flow electric layer or a plurality of photoelectric elements electrically connected to the two connections. The evaluation electrical signal includes means for measuring the intensity of the electrical signal or can be an electrical accoustical head phone which is used in the preferred embodiment when the light being coupled into the fiber cable has a pulse of a frequency within the audio range of an operators hearing. In addition, the photoelectrical sensing means preferably comprises a photoelectric material having a spectral sensitivity accommodating the wave length of the light such as the laser light being applied to the optical cable so that ambient light does not create false signals.

DESCRIPTION OF THE PREFERRED EMBODIMENTS

Figure 1:
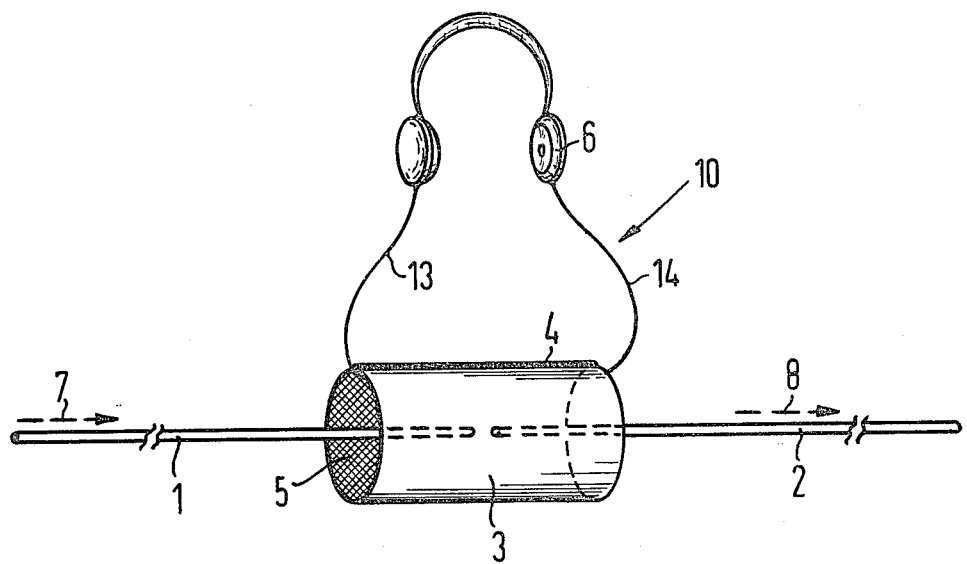
FIG. 1 is an isometric view of a device of the present invention utilized to perform the method of the present invention.
Figure 2:
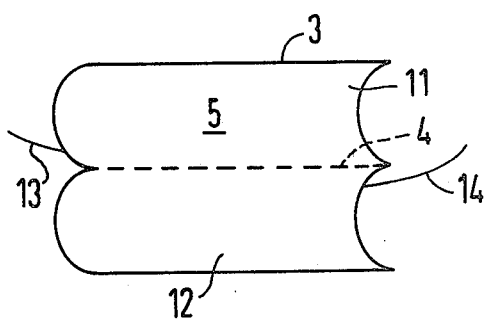
FIG. 2 is a view of a portion of the measuring device of FIG. 1 in an open position.

The principles of the present invention are particularly useful when incorporated in the measuring device generally indicated at 10 for aiding and positioning the ends of a first glass fiber cable 1 relative to the end of a second glass fiber cable 2 during a splicing operation to minimize light losses at the splicing location. The measuring device 10 includes a measuring cylinder 3 which, as best illustrated in FIG. 2, includes two halves of a cylinder 11 and 12 which are connected by a frame hinge 4 and have a continuous photoelectric layer 5 which extends over the hinge 4. The layer 5 has a pair of leads 13 and 14 which extend to the electrical accoustical device comprising head phones 6.

In operating the device 10, the halves 11 and 12 of the cylinder are wrapped around the two ends of the cables 1 and 2, which are to be spliced together. Light is introduced from the other end of the cable 1 as indicated by the broken arrow 7 in the form of light pulses. Light, which is passed through the end of the cable 1 into the end of the cable 2, travels in the form of light pulses 8. In an ideal case, the light power, which is coupled into the cable 1, is passed on undecreased to the second glass fiber cable 2 in the form of light pulses 8. For the monitoring and adjusting of the location of the ends of the two cables at the location of the splicing, the measuring cylinder is placed over the splicing location in an enveloping and surrounding manner. The photoelectric layer 5, which continuously covers the whole surface of interior surface of the cylinder will convert any light pulses 7 which are not coupled into the second cable 2 into electrical pulses. The electrical pulses will have a voltage so that there is a voltage difference between the flexible leads 13 and 14 which connect the output across the ear phone 6.

In a known manner, light which escapes at the location of the splice will produce electrical voltages in a known manner. The light pulses 7, which would be coupled into the cable 1, preferably have a pulse frequency which corresponds to the frequency lying in the audio range of the human ear which enables the electrical signals which are converted by the electro-accoustical device to be distinguished. The voltage of the measuring cylinder is then generated in pulses which is applied through the leads such as 13 and 14 across the ear phone 6. The erection engineer now has the task of adjusting the ends of the two cables which are being spliced until a minimum loudness is distinguished in the ear phones. Preferably, the pulse frequency of the light pulses 7, which are coupled into the cable 1 is selected to be at the frequency of the maximum sensitivity of the ear, which frequency is approximately 1000 Hz. The laser light power of the laser pulse 7 which has been coupled into the cable 1, is also adjusted corresponding to the cable length so that attenuation of the light traveling in the cable 1 will be compensated so that when the ends of the two cables 1 and 2 are properly positioned to obtain the minimum amount of light loss, this minimum amount of light loss will still generate a faint audible tone in the head phone 6.

Figure 3:
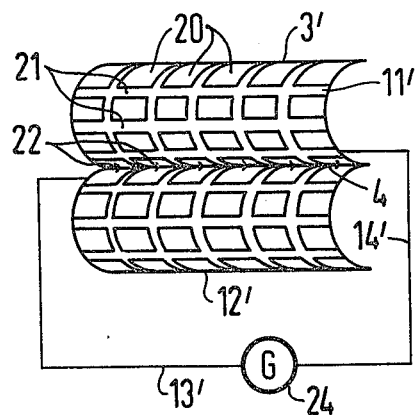
FIG. 3 is a view of an embodiment of the measuring device utilizing a measuring element instead of ear phones.

In the embodiment illustrated in FIG. 3, each of the halves 11' and 12' are provided with a multiplicity of photoelectric elements 20 which are interconnected electrically such as by leads 21 and 22 so that the measuring cylinder 3' will produce electrical signals of a different voltage potential on the two connected wires 13' and 14' which may extend to ear phones such as 6. However, if the pulses of the light connected into the cable are out of the audio range or if the light connected in the cable 1 is a continuous light source, then the electrical signals created by the photoelectric sensing means would be a continuous signal which can be monitored and evaluated by being applied to a current measuring device such as the galvanometer schematically illustrated at 24. Thus, an optimum position of the two ends of the cables is obtained when the measurement on the measurement device 24 are at the lowest value.

It should be noted that while the current measuring device 24 was illustrated with the embodiment having a plurality of photoelectric elements, it could also be used with the simple continuous photoelectric coating. It also should be noted that the continuous photoelectric coating can be subdivided to cover only each half 11 and 12 of the measuring device cylinder 3 with the two halves being interconnected across the hinge 4.

According to a further design of the invention, the spectral sensitivity of the photoelectrical material either for the continuous layer 5 or the multiplicity of photo elements such as the elements 20 is selected to accommodate the particular wave length of the laser light which is being introduced into the cable 1. Thus, background noise created by ambient light can be partially eliminated or minimized.

While the photosensitive device or means for sensing the light was described as a photovoltaic type device, photoconductive devices with an individual power supply could also be utilized. However, it should be noted that since the photoconductive device would require a separate power supply it would have an increased size and weight over the device which utilizes the photovoltaic type elements.

It also should be noted that once the position of the two end cables 1 and 2 have been determined, the measuring element can be removed while maintaining the ends in the desired position to enable splicing the two ends by known and conventional methods.

Although various minor modifications may be suggested by those versed in the art, it should be understood that we wish to embody within the scope of the patent granted hereon, all such modifications as reasonably and properly come within the scope of our contribution to the art.

We claim:

1. A method for monitoring and minimizing splicing losses in the splicing of glass fiber cables, comprising the steps of passing a light through one of the cables to be spliced, sensing the intensity of the light loss at the location of the splice photoelectrically to create a signal, evaluating the created signal, and during the evaluation of the created signal, adjusting the position of the two cable ends being spliced together relative to each other to obtain a minimum signal produced by a minimum loss of light at the splicing location.

2. A method according to claim 1, wherein the step of passing light into one of the cables comprises passing light pulses into said cable so that the light loss at the splicing location is in the form of light pulses, said step of sensing to create a signal creating an electrical pulse from the sensed light pulses, and said step of evaluating includes evaluating the electrical pulses.

3. A method according to claim 2, wherein the light pulses are at a frequency of an audio range of a human ear, said step of evaluating the electrical pulses including converting the electrical pulses into an accoustical sound by feeding the electrical pulses into an electro-accoustical converter.

4. A method according to claim 3, wherein the frequency of the light pulses are approximately 1000 Hz so as to be at the frequency of the maximum sensitivity of the ear.

5. A method according to claim 3, which includes adjusting the power of the light being introduced into the fiber cable to compensate for the cable attenuation due to the length of the cable so that regardless to the cable lengths at least a minimum amount of light to create an audible tone in the electro-accoustical converter is provided at the splicing location.

6. A method according to claim 3, wherein the positioning of the ends of the cables to obtain a minimum attenuation at the splice obtains a minimum intensity of the sound created by the electro-accoustical converter.

7. A method according to claim 1, wherein the step of introducing light into one of the glass fiber cables introduces a continuous light and the step of evaluating the electrical signal includes passing the created signal through an electrical current measuring device.

8. A device for sensing light loss at a splicing location while splicing a pair of fiber cables, said device including a measuring cylinder having a frame connected by hinge means for enabling opening up of the cylinders, an interior surface of the measuring cylinder being provided with photoelectric sensing means for sensing light and creating an electrical signal, said photoelectric sensing means having a pair of connection extending to means for evaluating the electrical signal created by the photoelectric sensing means.

9. A device according to claim 8, wherein the photoelectric sensing means comprising the substantially continuous photoelectric layer.

10. A device according to claim 8, wherein the photoelectric sensing means comprises a plurality of photoelectric elements electrically connected to the two connection.

11. A device according to claim 8, wherein the means for evaluating the electrical signal includes means for measuring the intensity of the electrical signal.

12. A device according to claim 8, wherein the means for evaluating the electrical signal includes an electrical accoustical head phone, said light being coupled into the fiber cable having a pulse of a frequency which is within the frequency range of the operator's hearing.

13. A device according to claim 8, wherein the means for photoelectrically sensing comprises a photoelectric material having a spectral sensitivity accommodating the wave length of a laser light which is applied to the fiber optical cable.

* * * * *